US008106758B2

(12) United States Patent
Loehndorf et al.

(10) Patent No.: US 8,106,758 B2
(45) Date of Patent: Jan. 31, 2012

(54) TIRE LOCALIZATION SYSTEM

(75) Inventors: Markus Loehndorf, Munich (DE);
Terje Kvisteroey, Horten (NO); Bjorn Blixhavn, Tonsberg (NO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/026,352

(22) Filed: Feb. 14, 2011

(65) Prior Publication Data

US 2011/0133922 A1    Jun. 9, 2011

Related U.S. Application Data

(63) Continuation of application No. 12/147,805, filed on Jun. 27, 2008, now Pat. No. 7,990,257.

(30) Foreign Application Priority Data

Jul. 25, 2007  (EP) ..................................... 07113126

(51) Int. Cl.
B60C 23/00    (2006.01)
(52) U.S. Cl. ....................................... 340/447; 340/442
(58) Field of Classification Search .................. 340/442, 340/447
See application file for complete search history.

(56) References Cited

U.S. PATENT DOCUMENTS

| 6,232,875 B1 | 5/2001 | DeZorzi |
| 6,385,511 B1 | 5/2002 | Fondeur et al. |
| 7,990,257 B2 * | 8/2011 | Loehndorf et al. ........... 340/447 |
| 2002/0084896 A1 | 7/2002 | Dixit et al. |
| 2005/0248446 A1 | 11/2005 | Watabe et al. |
| 2006/0290484 A1 | 12/2006 | Bauchot et al. |
| 2007/0069877 A1 | 3/2007 | Fogelstrom |

FOREIGN PATENT DOCUMENTS

| EP | 1026015 A2 | 8/2000 |
| WO | 9826946 A1 | 6/1998 |
| WO | 2005069993 A2 | 8/2005 |

OTHER PUBLICATIONS

Office Action dated Jan. 10, 2011 for U.S. Appl. No. 12/147,805.

* cited by examiner

Primary Examiner — Travis Hunnings
(74) Attorney, Agent, or Firm — Eschweiler & Associates, LLC

(57) ABSTRACT

A tire localization system for locating the position of a tire of a vehicle having five or more wheels, includes a number of tire pressure monitoring system (TPMS) wheel modules of a vehicle TPMS, each wheel module being attached to each one of the wheels or a tire thereof, respectively. Each TPMS wheel module includes a radio, frequency identification (RFID) reader. The system further includes a number of RFID tags, each RFID tag being associated with and storing wheel position information of one of the wheels, and each RFID tag being positioned externally of its associated wheel. Each of the RFID readers is arranged, upon activation, to interrogate its associated RFID tag, and the associated RFID tag is arranged, upon interrogation, to transmit its stored position information to the RFID reader for transmission by the TPMS wheel module to a central control unit. A tire localization method is also provided.

20 Claims, 1 Drawing Sheet

TIRE LOCALIZATION SYSTEM

CROSS REFERENCE TO RELATED APPLICATIONS

This application is a continuation of U.S. patent application Ser. No. 12/147,805 filed on Jun. 27, 2008, entitled "Tire Localization Systems", which claims priority under 35 U.S.C. 119 to Application No. EP07113126.2 filed on Jul. 25, 2007, entitled "Tire Localization System," the entire contents of which are hereby incorporated by reference.

FIELD

The invention relates to a tire localization system and a method for automatically localizing a tire of a vehicle having five or more wheels.

BACKGROUND

Existing auto-localization solutions are based on three approaches: local transmitters or receivers external to but near each wheel, which communicate only with the nearest wheel; determining a variation in signal strength between signals from different tires and individual variation of signal strength during a revolution of the tire; and determining the direction of rotation of the wheel by means of a two-axis accelerometer located inside the wheel.

These methods are not useful in the case where several tires are located close to each other, such as in trucks having multiple axles with twin tires, as differentiation between the tires, and hence accurate localization, is not guaranteed. No solution currently exists for auto-localization in such cases.

Tire pressure monitoring systems (TPMS) are now a common feature in cars, and provide the benefit of alerting the driver if the pressure of one or more tires falls below the minimum allowed value. The simplest systems only provide a warning signal, and give no indication of which tire is at fault. More elaborate systems also provide localization of the tire. This is found in passenger cars, where there is a relatively large distance between neighboring wheels. Several methods are known for achieving localization in such a case.

One proposed system uses electromagnetic LF communication between each wheel module and a receiving unit located close to the wheel.

In another proposed system, each wheel module contains a two-axis accelerometer which makes it possible to locate the wheel to the left- or right-hand side of the car, and uses detection of RF signal strength which is used to locate the wheel to the front or the rear.

Yet another proposed system involves observing differences in the signal transmission path from each wheel during one revolution of the wheel and comparing the observations to stored patterns in order to locate the wheel.

The present art may be able to locate one tire out of four, as required for a passenger car. However, known methods are not able to identify a particular wheel among the large number of wheels that can be found on larger vehicles.

In the following, the term "TPMS wheel module" refers to an electronic assembly located within a wheel for the purpose of observing and communicating certain parameters of the wheel or its environment (for example the tire thereof) to a control unit in the car. The TPMS wheel module may be attached to a wheel rim or a tire by any suitable method.

SUMMARY

According to the present invention there is provided a tire localization system for locating the position of a tire of a vehicle having five or more wheels, the system comprising:

A plurality of tire pressure monitoring system (TPMS) wheel modules of a vehicle TPMS, each wheel module being attached to each one of the wheels or a tire thereof, respectively, each TPMS wheel module comprising a radio frequency identification (RFID) reader; and A plurality of RFID tags, each RFID tag being associated with the storing wheel position information of one of the wheels, and each RFID tag being positioned externally of its associated wheel;

Wherein each of the RFID readers is arranged, upon activation, to interrogate its associated RFID tag, and wherein the associated RFID tag is arranged, upon interrogation, to transmit its stored position information to the RFID reader for transmission by the TPMS wheel module to a central control unit.

The present invention further provides a tire localization method for locating the position of a tire of a vehicle having five or more wheels, the method comprising:

Providing a plurality of tire pressure monitoring system (TPMS) wheel modules of a vehicle TPMS, each wheel module being attached to each one of the wheels or a tire thereof, respectively, each TMPS wheel module comprising a radio frequency identification (RFID) reader; and Providing a plurality of RFID tags, each RFID tag being associated with and storing wheel position information of one of the wheels, and each RFID tag being positioned externally of its associated wheel;

Activating at least one of the RFID readers to interrogate its associated RFID tag; and Transmitting the relevant stored information from the associated RFID tag to the RFID reader for transmission by the TPMS wheel module to a central control unit.

The system includes a combination of an RFID tag with position information at each wheel and an RFID reader in each wheel module. The RFID reader is preferably activated only when required due to a sensed change in a parameter of the wheel or tire, such as a reduction in tire pressure, to limit the power consumption of the device.

The invention applies primarily to vehicles with a large number of wheels or tires (such as large trucks, trailers, etc.) for example those arranged on multiple axles and/or as twin tires. However, the invention may also be used effectively in vehicles any number of wheels, for example in a standard car having four wheels.

Automatic tire localization is achieved by placing an RFID tag with unique position information near each wheel, and including an RFID reader in each wheel module. In one embodiment, when a wheel module senses a reduction in pressure or any other form of alarm condition in its tire or wheel, it activates its respective RFID reader and obtains information about its position from its associated RFID tag. This information is transmitted to the TPMS receiver together with details of the alarm situation and any other relevant information.

TMPS wheel modules are already known, but the addition of an RFID reader that communicates with an RFID tag placed outside the tire, and that uses the communication system of the TPMS to communicate with a central system, provides a far more accurate and efficient system. The RFID tag can be placed on the wheel arch shell or cover, or any other structure that is located close to the wheel. When the wheel module senses a reduced pressure or any other form of alarm condition, it activates its RFID reader and obtains information about its position. This information is transmitted to the TPMS receiver together with details of the alarm situation.

BRIEF DESCRIPTION OF THE DRAWINGS

The invention will now be described in detail with reference to the accompanying drawings, in which.

DETAILED DESCRIPTION

Figure 1:
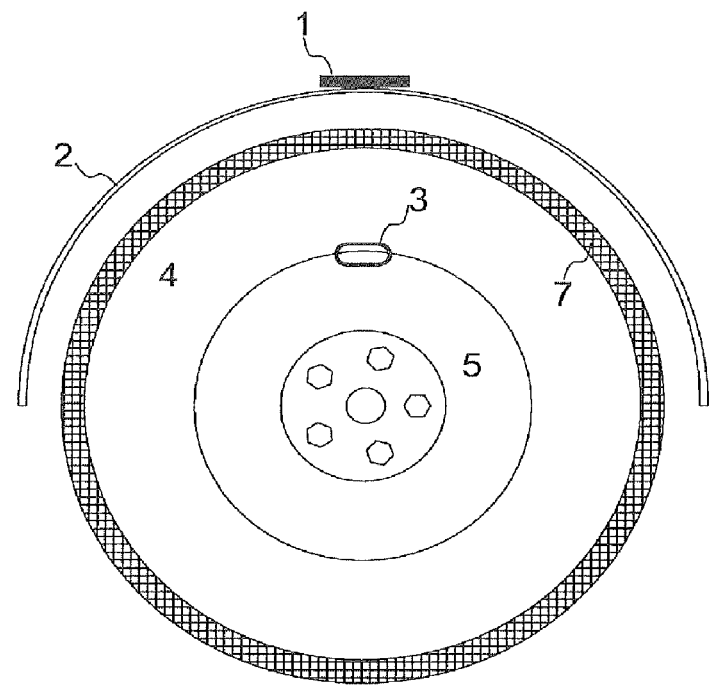
FIG. 1 shows a first embodiment of a tire localization system according to the invention.

FIG. 1 shows a first embodiment having a wheel, comprising a rim 5, and a tire 4 with a tire tread 7. A TPMS wheel module 3 is installed on the rim, although other installation positions on the wheel or tire are also possible. An RFID tag 1 is attached at a suitable position that is typically stationary with respect to the vehicle's main body. In FIG. 1, the RFID tag 1 is fixed to the wheel arch cover 2.

On a vehicle with five or more wheels, an RFID tag 1 with unique localization information is placed close to each wheel, and each wheel has a TPMS wheel module 3 which is capable of reading the RFID tag 1. The transmitter strengths and receiver sensitivities of the RFID communication are typically adapted such that each wheel module 3 will receive a response only from its nearest RFID tag 1.

Figure 2:
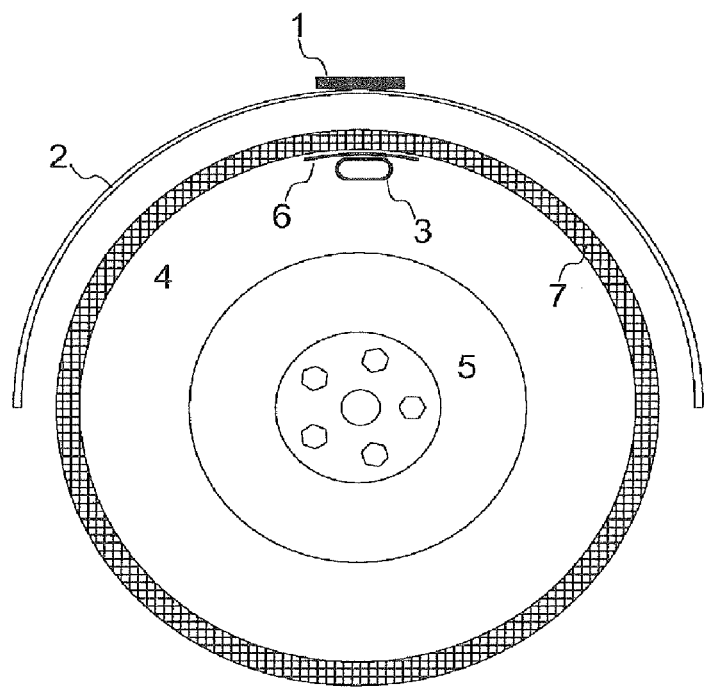
FIG. 2 shows a second embodiment of a tire localization system according to the invention.

FIG. 2 shows an alternate embodiment where the wheel module 3 is mounted on, or embedded in the tire tread 7. This configuration has the advantage that a larger antenna coil 6 for the RFID communication can be easily implemented, and the distance between the antenna and the RFID tag 1 is reduced.

Current RFID technology presents a large variety of technical choices. For the purpose of this invention, a passive RFID tag with a no battery is preferred due to its long lifetime. The operating frequency is preferably relatively low in order to avoid shielding effects from the steel cord of the tire. The standard frequency of 13.56 MHz is preferred since this ensures operation in the magnetic near field of the antenna. Other frequencies such as, for example, the standard RFID frequencies around 869 MHz may be used.

The TPMS wheel module 3 is typically powered by a battery of low capacity, in order to reduce weight, size and cost of the wheel module 3. Reading an RFID tag 1 requires a relatively high current, which soon exhausts the battery if the reading is performed frequently. In order to avoid this, two preferred methods of determining when to read the RFID tag 1 are described below.

One way in which to determine an appropriate time to read the RFID tag 1 is to read the RFID tag 1 only after an alarm situation has been identified within the wheel module 3. This occurs, for example, if the air pressure in the respective tire falls below a certain limit. Other parameters like temperature, vibration, friction, tire wear, etc. are also known as causing alarm situations in wheel module systems.

An additional way in which to determine an appropriate time to read the RFID tag 1 is applicable to wheel modules which include an accelerometer. Many known wheel modules use an accelerometer for motion detection, and in some cases dual axis accelerometers are used to perform tire localization. The accelerometer is able to detect the acceleration due to gravity. This is used to perform an RFID reading when the wheel module is in a favorable position with respect to the RFID tag 1. The sequence of operations then proceeds as explained below.

Firstly, an alarm situation, which for example corresponds to a change in a parameter of the wheel or tire 4, such as a reduction in pressure, is detected by the wheel module 3. The wheel module 3 then starts to sample the accelerometer, at a rate of several samples per revolution, in order to detect the ±1 g signal due to rotation in the earth's field of gravity. Once the ±1 g signal is detected, its phase with respect to the wheel module 3 position is determined. Next, based on pre-programmed information about the RFID tag 1 location, and the knowledge of wheel position against time obtained in the previous step, the wheel module selects the most favorable moment to activate the RFID reader in the wheel module 3. Finally, the tire localization information is received from the RFID tag 1 and included in the alarm message which is transmitted to the TPMS receiver.

In order to improve response time, the wheel module 3 can also transmit an alarm message without localization information immediately when the alarm condition is detected, and later transmits the localization information when it becomes available.

It is possible to employ tires with embedded RFID tags that contain information about the tire type, dimensions and date of manufacture. Therefore, although the primary purpose of the RFID reader in this invention is to obtain information about the localization of the tire, the same reader can also be used to obtain tire data where this is available. Such data is then preferably transmitted to the TPMS receiver as part of the alarm response.

The invention claimed is:

1. A tire localization system for locating the position of a tire of a vehicle having five or more wheels, the system comprising:
  a plurality of tire pressure monitoring system (TPMS) wheel modules of a vehicle TPMS, each TPMS wheel module being attached to each one of the wheels or a tire thereof, respectively, and each TPMS wheel module comprising a radio frequency identification (RFID) reader; and
  a plurality of RFID tags, each RFID tag being associated with and storing wheel position information of one of the wheels, and each RFID tag being positioned externally of its associated wheel;
  wherein each of the RFID readers is configured, upon activation, to interrogate its associated RFID tag, and wherein the associated RFID tag is arranged, upon interrogation, to transmit its stored position information to the RFID reader for transmission by the TPMS wheel module to a central control unit;
  wherein each of the RFID readers is configured to interrogate its associated RFID tag in response to an alarm situation identified by the respective RFID reader.

2. The tire localization system according to claim 1, wherein:
  each TPMS wheel module is arranged to sense a change in a parameter of its respective wheel or tire; and
  the system is arranged such that the respective RFID reader is activated by the wheel module in response to the sensed change.

3. The tire localization system according to claim 2, wherein the change in parameter sensed is a reduction in tire pressure.

4. The tire localization system according to claim 2, wherein each TPMS wheel module is arranged to transmit information relating to the change in parameter, together with stored position information received from its associated RFID tag, to a central control unit.

5. The tire localization system according to claim 2, wherein at least one of the TPMS wheel modules further comprises an accelerometer that is arranged to determine an angular position of at least one wheel with respect to the field of gravity, in response to a sensed change in a parameter of its respective wheel or tire, such that an appropriate time for transmitting the position information from the respective RFID tag to the RFID reader is determinable.

6. The tire localization system according to claim 1, wherein the RFID communication transmission strength and receiver sensitivity of the system are adapted such that each RFID reader of each wheel module communicates with its nearest RFID tag.

7. The tire localization system according to claim 1, wherein each RFID tag is provided on one of a wheel arch, a wheel shell or a wheel cover of its respective wheel.

8. The tire localization system according to claim 1, wherein each wheel module is provided on a wheel rim, on a tire inner-liner or in a tire tread of its respective wheel.

9. The tire localization system of claim 1, wherein the alarm situation comprises a tire parameter that violates a predetermined tire parameter criteria.

10. The tire localization system of claim 9, wherein the tire parameter comprises one of a tire pressure, tire temperature, tire vibration, tire friction, or tire wear.

11. The tire localization system of claim 1, further comprising a motion detector configured to determine an angular position of at least one wheel, wherein a respective one of the RFID readers is configured to ascertain a desired time to interrogate and/or receive position information from a respective RFID tag.

12. The tire localization system of claim 11, wherein the motion detector comprises an accelerometer.

13. A tire localization method for locating the position of a tire of a vehicle having five or more wheels, the method comprising:
   providing a plurality of tire pressure monitoring system (TPMS) wheel modules of a vehicle TPMS, each TPMS wheel module being attached to each one of the wheels or a tire thereof, respectively, and each TPMS wheel module comprising a radio frequency identification (RFID) reader; and
   providing a plurality of RFID tags, each RFID tag being associated with and storing wheel position information of one of the wheels, and each RFID tag being positioned externally of its associated wheel;
   activating at least one of the RFID readers to interrogate its associated RFID tag in response to an alarm situation identified by the respective RFID reader; and
   transmitting the stored information from the associated RFID tag to the RFID reader for transmission by the TPMS wheel module to a central control unit.

14. The tire localization method according to claim 13, further comprising:
   sensing a change in a parameter of each wheel or tire; and
   activating the respective RFID reader in response to the sensed change.

15. The tire localization method according to claim 14, further comprising sensing a reduction in tire pressure.

16. The tire localization method according to claim 14, further comprising transmitting information relating to the change in parameter, together with stored position information received from its associated RFID tag, from each TPMS wheel module to a central control unit.

17. The tire localization method according to claim 14, further comprising:
   determining an angular position of the at least one wheel with respect to the field of gravity, in response to a sensed change in a parameter of its respective wheel or tire, and determining an appropriate time for transmitting the position information from the respective RFID tag to the RFID reader based thereon.

18. The tire localization method according to claim 13, further comprising adapting the RFID communication transmission strength and receiver sensitivity of the system such that each RFID reader of each wheel module communicates with its nearest RFID tag.

19. The tire localization method according to claim 13, wherein each RFID tag is provided on one of a wheel arch, a wheel shell or a wheel cover of its respective wheel.

20. The tire localization method according to claim 13, wherein each TPMS wheel module is provided on a wheel rim, on a tire inner-liner or in a tire tread of its respective wheel.

* * * * *